(12) United States Patent  
Bantlin et al.

(10) Patent No.: US 8,332,438 B2  
(45) Date of Patent: Dec. 11, 2012

(54) METHODS AND SYSTEMS FOR MONITORING TECHNICAL OBJECTS

(75) Inventors: Stephan Bantlin, Baldham (DE); Alexander Bekhter, Walldorf (DE); Kai Finck, Schwetzingen (DE); Frank Hoerlin, Bad Schoenborn (DE); Janos Kis, Budapest (HU); Gudrun Leonhard Marquard, Hanhofen (DE); Feng Li, Dossenheim (DE); Karin Matthai, Nussloch (DE); Marek Poledna, Wiesloch (DE); Jens Schoeneberg, Kelkheim (DE); Hermann Weinmann, Angelbachtal (DE)

(73) Assignee: SAP AG, Walldorf (DE)

( * ) Notice: Subject to any disclaimer, the term of this patent is extended or adjusted under 35 U.S.C. 154(b) by 417 days.

(21) Appl. No.: 12/232,265

(22) Filed: Sep. 12, 2008

(65) Prior Publication Data

US 2010/0070539 A1    Mar. 18, 2010

(51) Int. Cl.  
*G06F 7/00* (2006.01)  
*G06F 17/30* (2006.01)

(52) U.S. Cl. .................. 707/803; 707/809; 709/220

(58) Field of Classification Search .................. None  
See application file for complete search history.

(56) References Cited

U.S. PATENT DOCUMENTS

| 7,831,693 | B2 * | 11/2010 | Lai | 709/220 |
|---|---|---|---|---|
| 2003/0149934 | A1 * | 8/2003 | Worden | 715/513 |
| 2005/0257193 | A1 | 11/2005 | Falk et al. | |
| 2007/0239762 | A1 * | 10/2007 | Farahbod | 707/102 |

OTHER PUBLICATIONS

EP Search Report dated Dec. 8, 2009, Application No. 09011625.2-1238, 9 Pgs.  
Ron Bodkin, "Using XML effective in eBusiness architectures", XML Europe 2000, Jun. 2000, pp. 1-16.  
Leah Davis, "X-Databases"—The Integration of XML into enterprise database management systems, Oct. 2000, pp. 1-65.  
Altova MapForce 2006 User and Reference Manual, 81 Pgs.  
"Mircrosoft BizTalkServer 2002 Technical Articles; XML Tools", Feb. 2002, pp. 1-26.  
"Stylus Studio 2007 User Guide, Chapter 5, Creating XSLT Using the XSLT Mapper" pp. 449-491.  
Rahm et al., "A survey of approaches to automatic schema matching" VLDB Journal, Springer Verlag, Berlin De, Nov. 21, 2001, vol. 10, pp. 334-350.  
Official Communication from the European Patent Office in European Patent Application No. 09 011 625.2-1238, dated Feb. 15, 2011, 8 pages.

* cited by examiner

*Primary Examiner* — Pierre Vital  
*Assistant Examiner* — Loan T. Nguyen  
(74) *Attorney, Agent, or Firm* — Finnegan, Henderson, Farabow, Garrett & Dunner LLP

(57) ABSTRACT

Methods, computer-readable media, and systems are provided for monitoring a technical object during, for example, a handover and/or takeover of the technical object. In one embodiment, a business partner may receive an XML file for a technical object. The business partner may generate a new structure, to represent the technical object, based on the XML file. The business partner may retrieve a corresponding structure from a backend component. The business partner may preprocess the new structure by performing a consistency check. The consistency check may include comparing the new structure to the corresponding structure. The business partner may store the new structure in a backend component after the preprocessing is complete.

23 Claims, 10 Drawing Sheets

METHODS AND SYSTEMS FOR MONITORING TECHNICAL OBJECTS

BACKGROUND

1. Technical Field

The present disclosure generally relates to the field of electronic data processing and the tracking and monitoring technical objects during their life-cycle. More particularly, the disclosure relates to tracking components of a technical object and the configuration of the components when the technical object is transferred between business partners or other entities during the life-cycle of the technical object.

2. Background Information

Generally speaking, technical objects (e.g., aircrafts, cars, tanks, machines, engines, and computers) are made up of various components (and may include subcomponents) that are configured in a certain manner. A business partner in possession of the technical object may carefully track, monitor, and update information about the components and the configuration of the components during the life-cycle of a technical object. The technical object may be transferred between business partners or other entities during the life-cycle of the technical object. For example, a technical object may be transferred when one company acquires the technical object from a different company. A technical object may also be moved if it is a part that is sent out from one business partner to another business partner for repair. Business partners may be, for example, different companies (e.g., a contractor and subcontractor, a seller and a buyer), different subsidiaries of a corporation, or different departments within a company. The entities between a technical object is transferred is not limited to these examples and may encompass entities that are not contractually or otherwise related.

When a technical object is moved between different business partners, the information about the technical object may also need to be transferred from a transmitting business partner to a receiving business partner. The process of providing a technical object with current information about the technical object is typically called a handover. The process of receiving the technical object with the information is typically referred to as a takeover. If a receiving business partner needs to continue to keep track of the information of a technical object, the business partner may need to set up a new technical object structure to keep track of the information. Also, different business partners may maintain information/data about a type of technical object or a component of the technical object in a different manner. Therefore, a business partner may need to determine how to use the information provided by the transmitting business partner in the structure for the technical object after a handover to the receiving business partner. A business partner may also handover a technical object back to the original business partner that provided the technical object (e.g., after completing a repair). The business partner may provide the technical object with information stored and maintained for the technical object (e.g., during the repair). The original business partner may use the newly received information to update information that was stored by the original business partner for the technical object (e.g., before the repair).

One approach for transferring information about a technical object from a transmitting business partner to a receiving business partner is providing paper documentation describing the current structure of the technical object. The structure may include components of the technical objects and the configuration of the components, as stored by the transmitting business partner. The transmitting business partner may organize and provide the information stored in their platform(s) (e.g., enterprise asset management ("EAM")/Enterprise Resource Planning ("ERP") systems) for the technical object. A transmitting business partner may hand over the paper documentation to the receiving business partner. The receiving business partner may then manually enter information from the documentation into their platform(s) (EAM/ERP system(s)).

The above approach has several drawbacks. There is no standard for data exchange for a technical object between business partners. For example, the transmitting business partner needs to organize the data for transmission to the receiving business partner, which then reorganizes and reenters the data its own platform(s). Particularly, the takeover is largely a manual process. As a result, the process may become highly complex and time consuming. Furthermore, there is no automated processing that can determine which old components need to be removed from the structure of the technical data object.

Alternatively, the transmitting business partner may provide the receiving business partner with a file (e.g., spreadsheet file) including the information about a technical object during handover. The information needs to be copied and pasted from the file into the receiving business partner's platform(s) during takeover. This approach shares many of the same drawbacks discussed in connection with providing paper documentation.

Yet another alternate approach is for all the business partners to maintain data about a technical object in the same exact way using the same exact systems. This approach is highly unrealistic and undesirable. An individual business partner typically stores data in a certain way using particular systems based on their own unique business needs and preferences.

In view of the foregoing, there is a need for an improved solution for the handover and takeover process. In particular, there is a need for systems and methods for simplifying the handover and takeover process and increasing efficiency of that process. Specifically, improved solutions need to increase user productivity, reduce time required set up the data, reduce probability of errors, provide visibility of takeover progress/status, and reduce time needed for initial data preparation. The solution also needs to provide a mechanism to ensure consistency of information that is tracked and monitored during the life-cycle of the technical object.

SUMMARY

Disclosed embodiments provide methods, computer-readable media, and systems for tracking and monitoring a technical object during a lifecycle of the technical object. This is achieved, in part, by providing the ability to transmit a representation of a structure of a technical object between different business partners.

In one exemplary embodiment, a computer-implemented method is provided including, for example, receiving an XML file for the technical object; generating a new structure to represent the technical object based on the XML file, wherein the new structure comprises data indicative of components of the technical object and configuration of the components; retrieving a corresponding structure from a backend component, wherein the corresponding structure comprises data and at least one of an old structure stored for the technical object or a template structure for a type of the technical object; preprocessing the new structure, wherein preprocessing comprises performing a consistency check, and wherein performing a consistency check comprises comparing the new structure to the corresponding structure; and storing the new structure in a backend component.

In one alternate embodiment, the preprocessing may include determining if the new structure is equivalent to the corresponding structure, wherein the determination is based on comparing functional locations, wherein if the determination is positive, adopting the new structure as the corresponding structure; and wherein if the determination is negative, preprocessing further comprises adjusting the new structure based on the corresponding structure. In another alternate embodiment, performing the consistency check may include determining whether there is a corresponding component for each one of the components of the new structure in the corresponding structure; and determining whether data associated with each one of the components and any subcomponents of each one of the components is proper based on the corresponding structure. In another alternate embodiment, preprocessing may include adjusting the new structure based on the consistency check.

In another alternate embodiment, adding the new structure to the backend component may include replacing the corresponding structure with the new structure in the backend.

In another alternate embodiment, status of the preprocessing of an individual component of the new structure may be displayed using an indicator for the individual component. In another alternate embodiment, a user may save an intermediate state of preprocessing of an individual component of the new structure and resume the preprocessing of the individual component from the intermediate state.

In another alternate embodiment, determining whether data associated with each one of the components and any subcomponents of each one of the components is proper may include determining if a functional location of a component is proper.

In another alternate embodiment, the method may further include displaying the configuration of the new structure by displaying a hierarchical representation of the components and subcomponents of the components. In another alternate embodiment, the method may include displaying the new structure and the corresponding structure in a user interface. In another alternate embodiment, a user may be provided an ability to modify the new structure in the user interface. In another alternate embodiment, the ability to modify the new structure may include an ability to assign a new component to the new structure and an ability to delete a component from the new structure. In another alternate embodiment, a new component may be marked based on status of the assigning of the new component.

In another alternate embodiment, the method may further include automatically detecting a component removed or modified in the technical object; and modifying the new structure based on the detecting.

In another exemplary embodiment, a computer-implemented method is provided, the method including, for example: receiving information corresponding to the technical object; generating the structure for the technical object based on the information, wherein the structure comprises data representing components of the technical objects and a configuration of the components; generating an XML file based on the structure and a predefined XML schema; and transmitting the XML file to a receiving business partner with the technical object.

In one alternate embodiment, the method may further include creating maintenance plans for the technical object based on maintenance program definition documents; and generating notifications for the technical object. In another alternate embodiment, the predefined XML schema may be set by at least the receiving business partner and a transmitting business partner.

In another exemplary embodiment, a system for monitoring a technical object is provided including, for example: a database for storing information about the technical object; a processor for generating a structure comprises data representing the technical object based on the information or a takeover XML file, for generating a handover XML file based on the structure, and for performing a consistency check of the structure based on a corresponding structure, wherein the corresponding structure comprises data and is at least one of an old structure stored for the technical object or a template structure for a type of the technical object; and a display unit for displaying a visual representation of the structure in a user interface.

In one alternate embodiment, the system may further include a communication unit for transmitting the XML file to the receiving business partner. In another alternate embodiment, the user interface may provide a user an ability to modify the structure, the display unit may display the structure based on the takeover XML file and the corresponding structure, and the corresponding structure may be stored in the database. In another alternate embodiment, the processor may automatically detect modifications in the technical object and adjusts the structure based on the detection and displays an indicator on the user interface to indicate status of the consistency check.

It is to be understood that both the foregoing general description and the following detailed description are exemplary and explanatory only and are not restrictive of embodiments thereof, as claimed.

BRIEF DESCRIPTION OF THE DRAWINGS

The accompanying drawings, which are incorporated in and constitute a part of this disclosure, illustrate embodiments and aspects of the disclosed embodiments. In the drawings.

DETAILED DESCRIPTION

Figure 1:
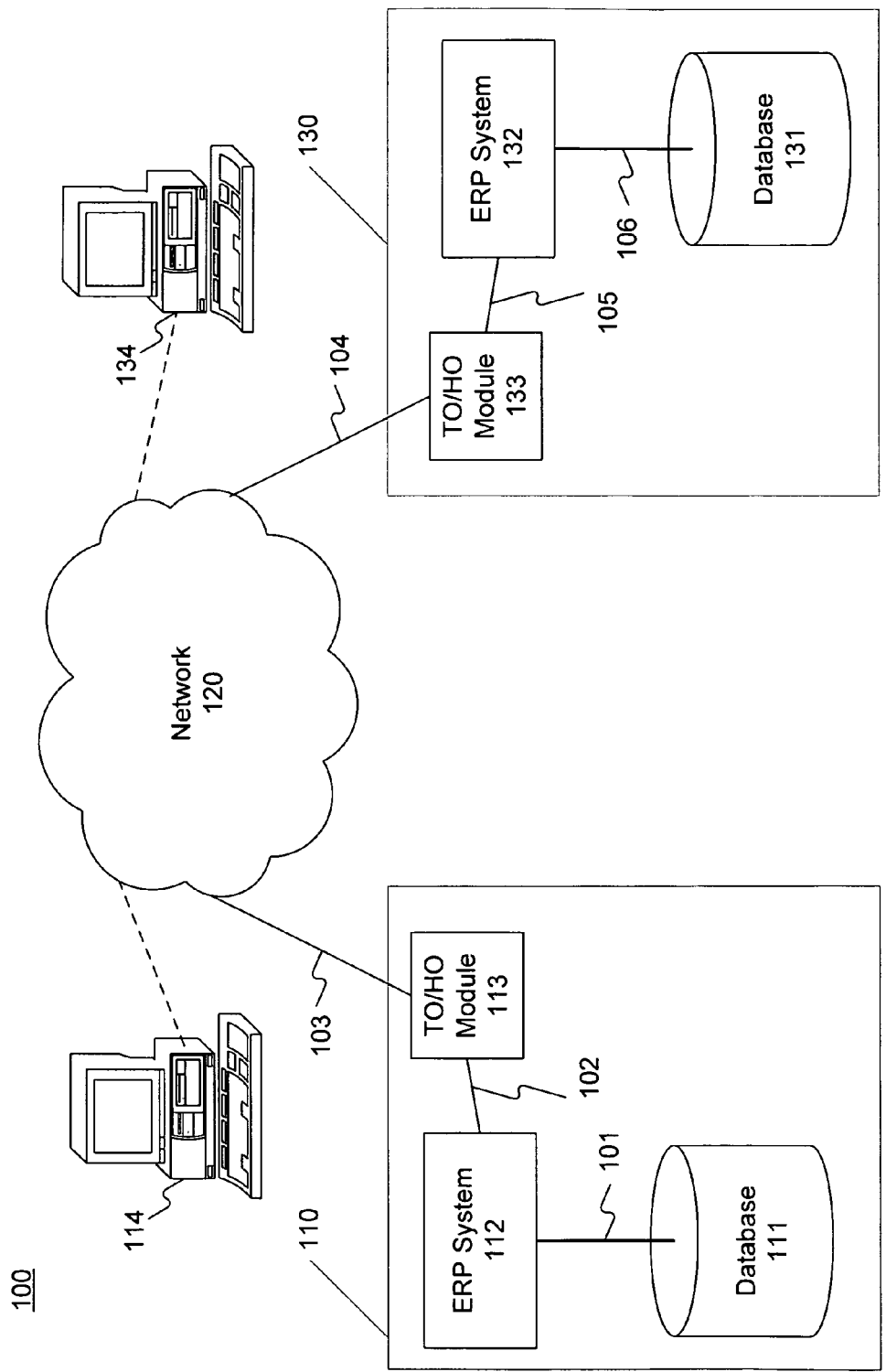
FIG. 1 is a block diagram illustrating an exemplary system, consistent with a disclosed embodiment.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the disclosed embodiments. For example, substitutions, additions, or modifications may be made to the components illustrated in the drawings, and the exemplary methods described herein may be modified by substituting, reordering, or adding steps to the disclosed methods. Accordingly, the following detailed description does not limit the embodiments. Instead, the proper scope is defined by the appended claims.

A technical object is any physical item that is made up of various components. Examples of technical objects include various parts, equipment, and machines. Accordingly, a component or subcomponent of a technical object may itself be considered a technical object. A business partner may maintain and update information about a technical object while in possession of the technical object. The information may include information about the various components of the technical object and the configuration of the components. An ERP system or any other suitable system or platform of the business partner may store the information about the technical object in a structure that allows the business partner to maintain the information. As used herein, the term "structure" refers to any data construct that conveys information and can be stored in a database or other memory device.

A business partner may transfer a technical object to a different business partner, one or more times, during the lifecycle of the technical object. Different business partners may maintain and organize information about the same type of technical object or the same technical object in a different manner. Disclosed embodiments may allow a business partner to handover the information maintained for a technical object in an XML (Extensible Markup Language) file, along with the technical object. Disclosed embodiments may allow the business partner to generate the XML file based on the structure for the technical object that is maintained in the business partner's ERP system. For example, the business partner may generate the XML file based on XML and global data types (GDTs) agreed to by the business partner and the receiving business partner, some limited group of business partners, or an industry-wide standard.

Disclosed embodiments may allow the receiving business partner to takeover the technical object with the XML file. For example, the receiving business partner may recognize the XML and read the information stored by the XML file. Thereafter, the receiving business partner may preprocess the stored information. The preprocessing may include performing a consistency check and a data correctness on the stored information. This may allow the receiving business partner to determine if the information is organized and maintained properly based on its own standards for organizing and maintaining information for the technical object or type of technical object, and the individual components of the technical object. The receiving business partner may perform a consistency check by comparing the information stored in the XML file with a structure or structures that the receiving business partner uses to store the technical object, a type of the technical object, or individual components of the technical object. The receiving business partner may then adjust and update information stored in the XML file based on the consistency and data correctness check. Thereafter, the receiving business partner may represent the newly adjusted information as a structure for the technical object in its own ERP system and store information about the structure in a backend component of the ERP system.

FIG. 1 is a block diagram illustrating the components of an exemplary system 100, consistent with a disclosed embodiment. The system may include two business partners 110, 130. For example, business partner 110 may be a transmitting business partner that hands over a technical object and information about the technical object to receiving business partner 130. Business partner 110 may maintain a database 111, an ERP system 112, and a takeover/handover ("TO/HO") module 113. A user may access information stored and presented by business partner 110 through a user terminal 114. User terminal 114, database 111, ERP system 112, and TO/HO module 113 may be on the same or different computer systems. Examples of such computer systems include personal computers, servers, and handheld computers. User terminal 114, database 111, ERP system 112, and TO/HO module 113 may also be distributed over multiple computer systems. For example, database 111 may represent multiple computer databases on different computer systems. Database 111 may also represent the storage of information relating to a technical object that is not stored in a database, but in some different manner (e.g., computer-readable media). User terminal 114, database 111, ERP system 112, and TO/HO module 113 may communicate with each over a communication medium 101, 102, 103. Communication mediums 101-101 may be either inside a computer system, intranet, internet, etc, and may include wired and/or wireless connections. TO/HO module 113 and database 111 may also be both or individually part of ERP system 112. ERP system 112 may comprise multiple platforms.

User terminal 114 may represent multiple user terminals. User terminal 114 may also be located remotely from business partner 110 and communicate with each other through network 120. A user may use the user terminal 114 to access information that is stored in database 111 through ERP system 212. The user may also use the user terminal 114 to select information for download by TO/HO module 213 from network 120, and storage in the database 111. A user may also use user terminal 114 to generate a representation of a structure for a technical object to update or modify information stored about the technical object.

Database 111 may store information related to a technical object possessed at a present time by business partner 110. Database 111 may store the information in a particular manner based on how business partner 110 wants the information presented in ERP system 112. Business partner 110 may access the information about a technical object through ERP system 112. For example, ERP system 112 may retrieve the information from database 111 through communication medium 101. ERP system 112 may present the information, which was retrieved from database 111, via a user interface presented on user terminal 114. ERP system may generate a structure based on the information to represent components of the technical object and a configuration of the components. A structure may define how information about a technical object is organized, presented, and stored by a particular ERP system of a particular business partner. The user interface of ERP system 112 may present the structure. Business partner 110 may use the interface in ERP system 112 to update or modify information about the technical object. Business partner 110 may store the updated/modified information relating to a technical object that was altered using ERP system 112 in the database 111. Database 111 may be considered a backend component of ERP system 112.

Business partner 110 may need to prepare information about the technical object before handing it over to business partner 130. Information about the technical object may be retrieved by ERP system 112 from database 111. ERP system may generate a structure of the technical object based on the retrieval information. TO/HO module 113, which may be part of ERP system 112, may generate an XML file based on the information retrieved from the database 111 for the technical object or the structure generated by ERP system 112 for the technical object. TO/HO module 113 may generate the XML file based on predefined XML and global data types ("GDTs"). TO/HO module 113 may then transmit the XML file through communication medium 103 over network 120 to business partner 130. TO/HO module 113 may also store the XML file on a computer-readable medium. Business partner 110 may handover the XML file, via a network or using a physical medium, to business partner 130 before, after, or during the time when the technical object is physically handed over to business partner 130.

Business partner 130 may maintain a database 131, an ERP system 132, and a TO/HO module 133. A user may access information stored and presented by business partner 130 through a user terminal 134. User terminal 134, database 131, ERP system 132, and TO/HO module 133 may perform the same functions and be organized in similar arrangements as user terminal 114, database 111, ERP system 112, and TO/HO module 113, respectively, of business partner 110. TO/HO module 133, which may be part of ERP system 132, may receive the XML file over communication medium 104 from network 120. TO/HO module 133 may also receive the XML file by reading it from a computer-readable medium. TO/HO module 133 (the frontend of ERP system 132 may perform functions attributed to TO/HO module 133 that is discussed hereinafter) may generate a new structure representing the technical object based on the XML file. The new structure may be represented in a user interface of TO/HO module 133. User terminal 134 may present (display) the user interfaces of ERP system 132 and TO/HO module 133.

TO/HO module 133 may preprocess the new structure. If the technical object is being returned to business partner 130, business partner may store a corresponding structure for the technical object. In that case, business partner 130 stored a corresponding structure for the technical object before business partner 130 handed over the technical object to a different business partner. Alternatively, business partner 130 may store a corresponding structure that is a template structure for a type of the technical object. Business partner 130 may also store other defining information necessary for preprocessing the new structure. The other defining information may include, for example, template structures for the components of the technical object. ERP system 132 may retrieve a corresponding structure and other defining information for the technical object from database 231 over communication medium 106, 105.

A user interface of TO/HO module 133 may present the new structure, generated based on the XML file, and the corresponding structure. The new structure may be synchronized with the corresponding structure. TO/HO module 133 may automatically detect differences between an actual state of the technical object and its representation in the new structure, and adjust the new structure accordingly. ERP system 132 may replace data representing the corresponding structure with data representing the new structure in database 131. Thereafter, business partner 130 may retrieve the structure from database 131 for use in ERP system 132.

Figure 2:
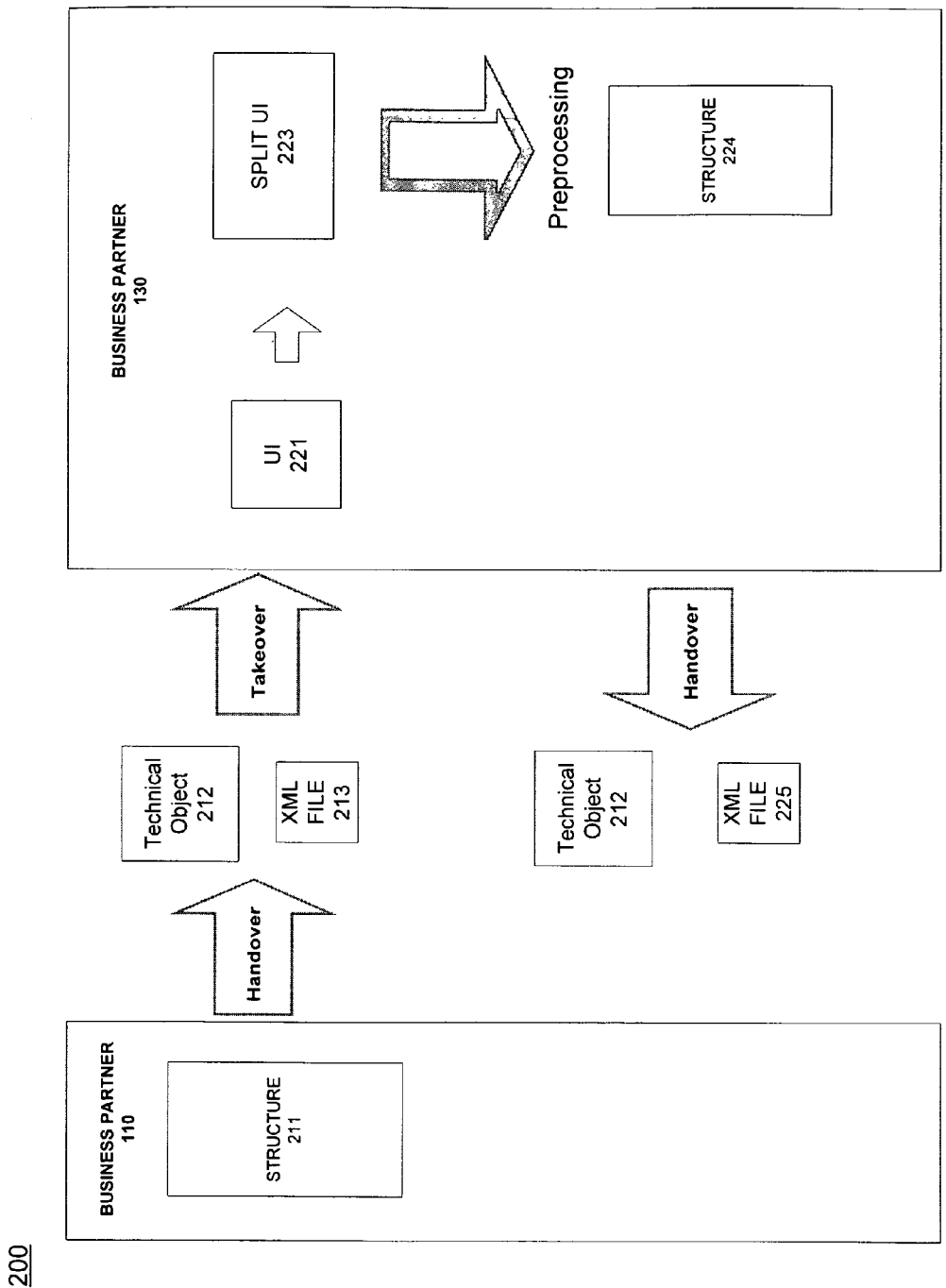
FIG. 2 is an exemplary diagram showing handover and takeover, consistent with a disclosed embodiment.

FIG. 2 is an exemplary diagram showing a handover and a takeover 200, consistent with a disclosed embodiment. The handover and the takeover may occur on a system illustrated in FIG. 2 between two business partners 110, 130. A reference to a business partner, hereinafter, may also refer to a system of the business partner. Structure 211 represents information about technical object 212 organized in manner such that business partner 110 may access and maintain/update structure 211 on its own ERP system 112. Business partner 110 may store structure 211 in a database 111. Structure 211, or information for structure 211, may be retrieved from database 111 and presented by the ERP system 112. The structure 211 may contain information about the components and subcomponents of the technical object 212 and the configuration of the components and the subcomponents. A functional location may be used for each component and subcomponent to store information about the configuration. The configuration of the technical object 212 may be represented by displaying the components and subcomponents hierarchically in a user interface of the ERP system 112.

When business partner 110 is ready to handover technical object 212, business partner 110 may also handover information represented by structure 211, to business partner 130. During this process, business partner 110 may be called the "transmitting" business partner and business partner 130 may be called the "receiving" business partner. At a later point, the roles of the business partner may change regarding technical object 212. Business partner 110 may not be able to handover structure 211, in a format compatible with business partner 110 because business partner 130 may use different platform (s) or store/represent information about a technical object differently. Therefore, in order to handover the information represented by structure 211, business partner 110 may need to generate an XML file 213 based on the structure 211. For example, business partner 110 may generate XML file 213 according to a predefined XML schema and predefined global data types (GDTs).

Business partner 110 may then handover technical object 212 and XML file 213 to business partner 130. Business partner 110 may transmit XML file 213 to business partner 130 over a network (internet/intranet) 120, using a portable computer readable media, and in any other way that the XML file may be transmitted. Business partner 130 may then takeover technical object 212 and XML file 213 that contains information about the technical object 212. During takeover, business partner 130 may recognize XML file 213 as an XML file containing data for technical object 212. Business partner 130 may then read XML file 113, generate a new structure based on the information in the XML file, and display a representation of the new structure in a user interface ("UI") 221 of user terminal 134. UI 221 may display the components of technical object 212, configuration of the components, the subcomponents of each component, the functional location of each component/subcomponent, and other information about a component/subcomponent (e.g., serial number, manufacturer, material). The new structure may be presented in UI 221 based on how structure 211 was organized by business partner 110.

Business partner 130 may then determine that the new structure is not presented in UI 221 in the format that is compatible with platform(s) of business partner 130. Business partner 130 may then determine if it already stores a structure for technical object 212 or if technical object 212 is a new structure to business partner 130. If it is determined that business partner 130 stores an existing corresponding structure for technical object 212, business partner 130 may retrieve the corresponding structure. Otherwise, business partner may retrieve a corresponding structure which is a template structure for the type of technical object 212. Business partner 130 may display the corresponding structure side by side on UI 223 next to the new structure, which is generated based on XML file 213. Business partner 130 may then (further) preprocess the new structure. TO/HO module 133, of business partner 130, may do the preprocessing without disturbing the backend components 131 of the platform(s) 132. Preprocessing may include performing a consistency check on the new structure to make sure it is consistent with the corresponding structure. Preprocessing may include determining whether each component in the new structure exists in the corresponding information. Preprocessing may further include determining if the component is in the correct functional location. A correct functional location may mean that the functional location of a component or technical object is described in the same way in the new structure as it is in the corresponding structure. A consistency check may further include determining if all the information for each component is proper (e.g., the material exists, a serial number of component is unique, and the component may be part of the technical object).

Preprocessing may also be done individually for each component and subcomponent of the new structure. The TO/HO module 133 or ERP system 132 may retrieve a corresponding structure or other defining information for each component and subcomponent. If technical object 212 or any of the components/subcomponents are of a type not recognized (i.e., they are a new type) by business partner 120, a relevant part of the new structure may be adopted and modified based on pre-set rules or structures analogous to the new type.

An indicator (e.g., a stoplight) may correspond to and be displayed next to (on the same line as) the listed technical object 212, each component of technical object 212, and any subcomponent of each component in UI 223. The indicator may indicate the status of the preprocessing or the consistency check. If the indicator is a stoplight, the color of the stoplight may indicate the consistency of the listed technical object 212, each component of technical object 212, and any subcomponent of each component. For example, a green light next to a component may indicate that the component is consistent and the data associated with the component is proper. As another example, a yellow light next to a technical object may indicate that some of the components are consistent and proper and some are not. A stoplight (e.g., a red light) may indicate other information and have a multitude of meanings. Furthermore, other indicators besides a stoplight color may indicate the status of preprocessing or a consistency check.

If it is determined that some of the new structure is not consistent during the consistency check, business partner 130 may be able to automatically adjust the information (e.g., change component information/rearrange components, assign new functional location). Business partner 130 may be able to automatically detect changes in the technical object 212 and adjust received information to be consistent and proper based on the corresponding information considered during the detection. UI 223, displayed on user terminal 134, may provide a user with the ability to manually make changes to the new structure to make it consistent and proper for business partner's 130 ERP system 132. The stoplights may change during the preprocessing of the information. Once the new structure is synchronized (i.e., preprocessing is complete), the corresponding structure may be replaced/updated with synchronized new structure 224. Business partner 130 may now store synchronized new structure 224 in database 131. Business partner 130 may access and update stored structure 224 while possessing technical object 212 using its own platform(s) (e.g., ERP system 132).

A user may use ERP system 232, through user terminal 134, to update and modify structure 224 during the life-cycle of technical object 212, while business partner 130 possesses technical object 212. During the life-cycle, business partner 130 may handover technical object 212 back to business partner 110 or to a different business partner. Business partner 130 may handover information 224 with technical object 212. As discussed above regarding handover by business partner 110, business partner 130 may generate an XML file 225 based on structure 224, predefined XML schema, and GDTs. Business partner 130 may transmit technical object 212 and XML file 225 to business partner 110 or a different business partner.

Figure 3:
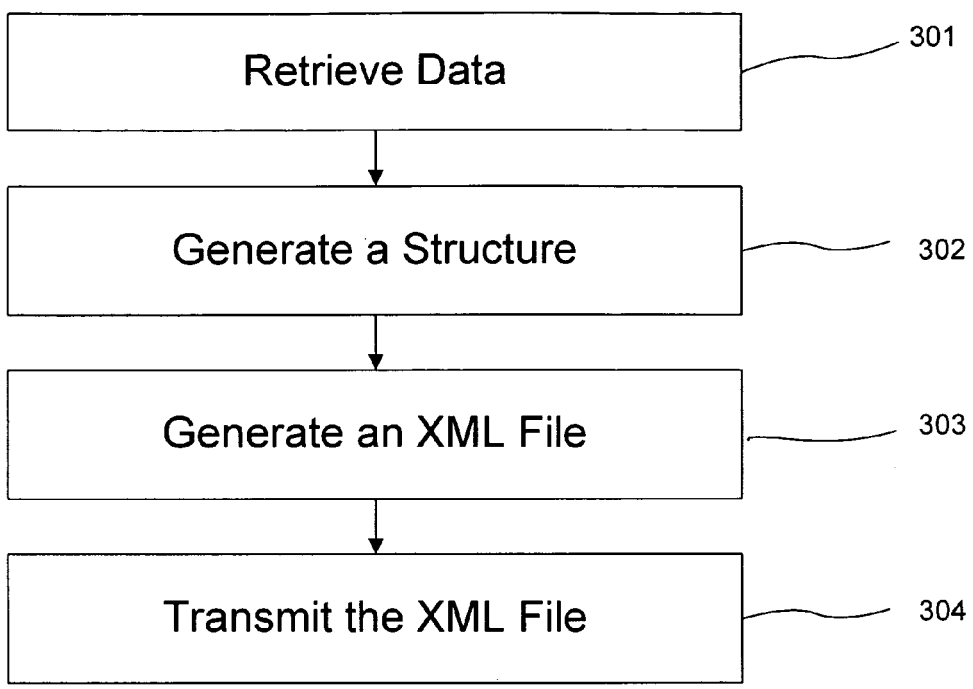
FIG. 3 is a flowchart of an exemplary method for a handover, consistent with a disclosed embodiment.

FIG. 3 is a flowchart of exemplary method 300 for a handover, consistent with a disclosed embodiment. Method 300 may be executed, for example, by business partner 110 illustrated in FIG. 1. In step 301, ERP system 112, for example, may receive information related to a technical object. In step 301, business partner 110 may also receive maintenance information for the technical object.

In step 302, ERP system 112 may generate a structure based on the information. The structure may include components of the technical object and parameters for one or more of the components. A parameter for a component may be the functional location of the component. The structure may provide a configuration of the technical object based on the functional locations of the components. The structure may also include subcomponents of the components.

In step 303, ERP system 112 or TO/HO module 113 may generate an XML file based on the structure. Alternatively, in step 303, ERP system 112 or TO/HO module 113 may generate the XML file based on the information retrieved at step 301. ERP system 112 or TO/HO module 113 may generate the XML file in accordance with a predefined XML schema and GDTs.

In step 304, TO/HO module 113 may transmit the XML file to a different business partner (e.g., business partner 130). TO/HO module 113 may transmit the XML file at the same time the technical object is transmitted. Business partner 110 may transmit the XML file over a network 120 or by providing a computer-readable medium storing the XML file.

Figure 4:
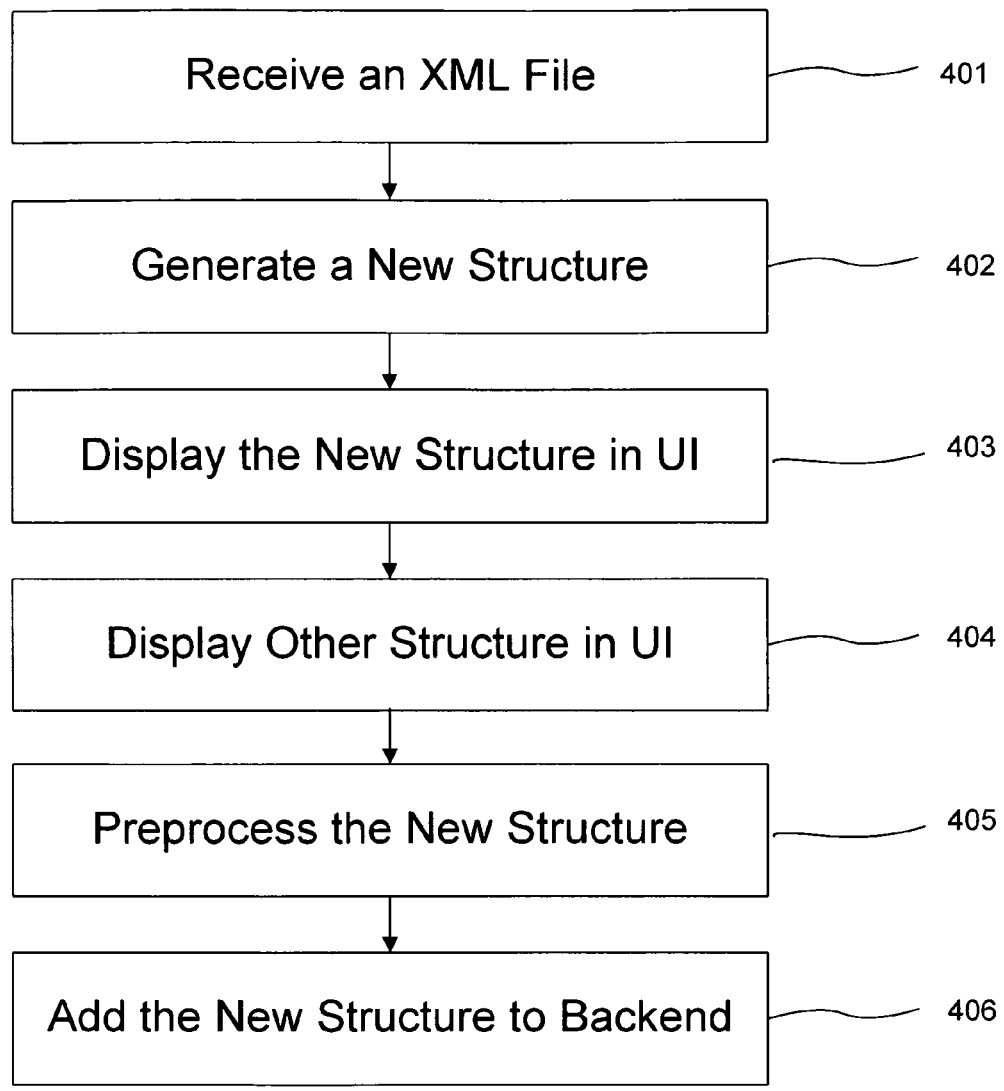
FIG. 4 is a flowchart of an exemplary method for a takeover, consistent with a disclosed embodiment.

FIG. 4 is a flowchart of exemplary method 400 for a takeover, consistent with a disclosed embodiment. Method 400 may be executed, for example, by business partner 130, illustrated in FIG. 1. In step 401, TO/HO module 133 may receive an XML file from a different business partner (e.g., business partner 110). The XML file may be received when business partner 130 receives the technical object from the different business partner.

In step 402, ERP system 132 or TO/HO module 133 may generate a new structure based on the XML file. The new structure may organize data about the technical object based on the way data was stored and organized by the different business partner.

ERP system 132 or TO/HO module 133 may display the new structure in a user interface of user terminal 134 at step 403. ERP system 132 or TO/HO module 133 may then retrieve a corresponding structure, for the technical object, from database 131. The corresponding structure may be based on information that business partner 130 stored for the technical object before receiving the XML file. Alternatively, the business partner may retrieve a corresponding structure, which is a template structure for the type of the technical object.

In step 404, ERP system 132 or TO/HO module 133 may display the new structure and the corresponding structure in user interface 134. In step 405, ERP system 132 or TO/HO module 133 may preprocess the new structure based on the corresponding structure. After the preprocessing is complete and the new structure is synchronized with the corresponding structure, ERP system 132 may add the new structure to a backend component in step 406. Adding the new structure may consist of replacing the corresponding structure with the new structure for the technical object.

Figure 5:
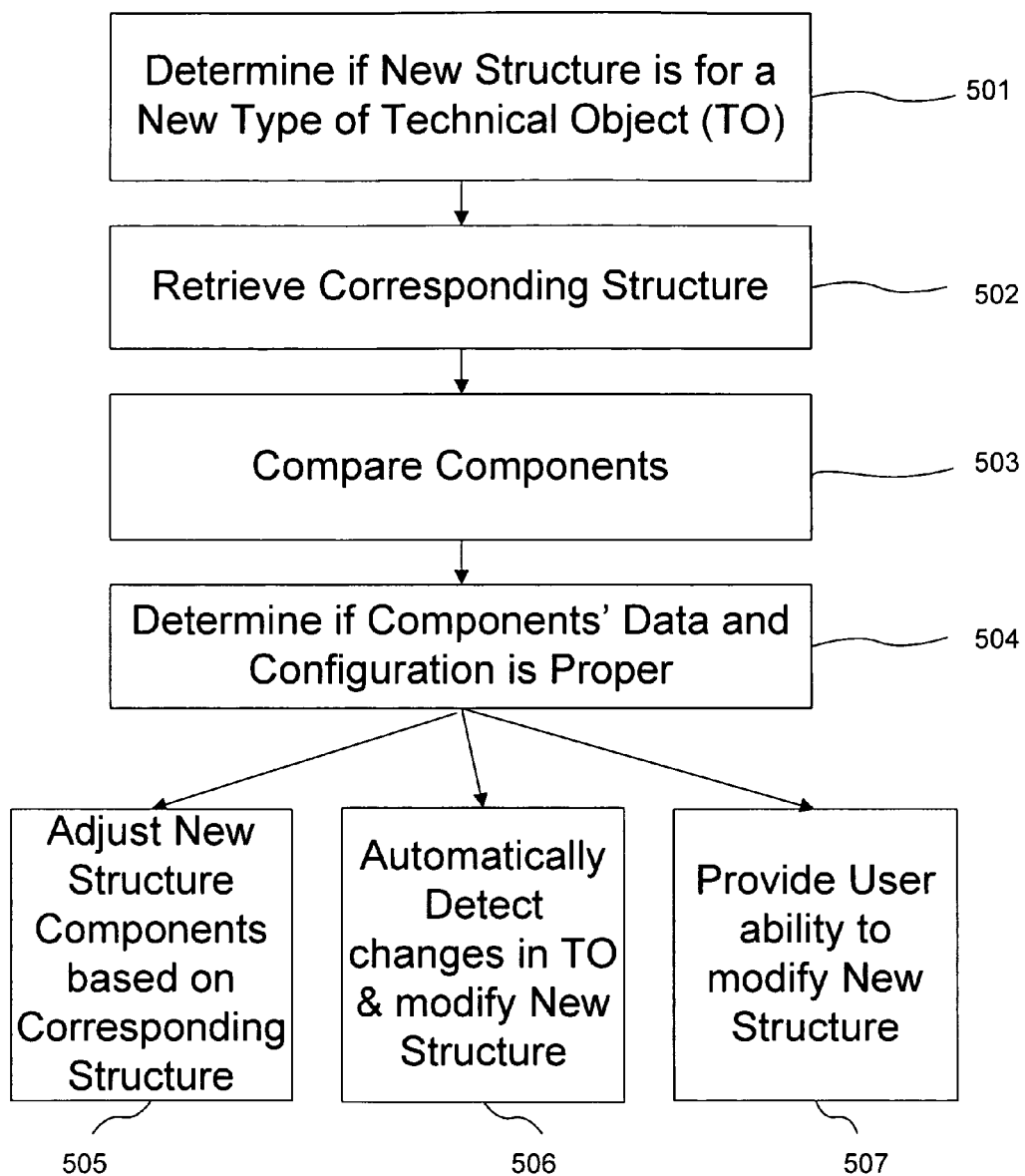
FIG. 5 is a flowchart of an exemplary method for preprocessing, consistent with a disclosed embodiment.

FIG. 5 is a flowchart of exemplary method 500 for preprocessing, consistent with a disclosed embodiment. In step 501, a receiving business partner may determine if a new structure representing a technical object taken over is for a new type of technical object. The receiving business partner may have generated the new structure based on an XML file after receiving the technical object with the XML file. A new type of technical object is one for which the receiving partner does not have a corresponding structure. A corresponding structure may refer both to a structure for the same technical object that the receiving business partner has taken over and a template structure for the type of technical object the receiving business partner has taken over.

In step 502, the receiving business partner may retrieve the corresponding structure. In step 503, the receiving business partner may then preprocess each of the individual components and subcomponents. The receiving business partner may compare the components and the configuration of the components of the new structure and the configuration of the components of the corresponding structure. Furthermore, the receiving business partner may preprocess each of the individual components of the new structure by comparing the individual components to corresponding structures that the receiving business partners has for the individual components.

In step 504, the receiving business partner may make a determination regarding whether data for each component and the configuration (functional location) of the component is proper based on the comparison. A determination if a component is proper may include a determination of data correctness. Method 500 may include steps 501-504 as part of a consistency check during preprocessing. A consistency check may include other determinations regarding each component.

A stoplight or another type of indicator may indicate the result of a consistency check for the new structure, component, and sub-component. Any update/modification of the new structure, component, and sub-component that change consistency of the respective unit may cause the stoplight to change. The receiving business partner may execute steps 505-507 to change consistency of a unit.

In step 505, components of the new structure may be adjusted based on the corresponding structure. In step 506, the receiving business partner may automatically detect changes in the technical object and the new structure may be modified accordingly. In step 507, a user may manually modify the new structure. The manual modification may include adding components, deleting components, and adjusting data related to a component. A new component may be marked based on a status of the assigning of the new component to the structure. The marking may be indicated, for example, by a stoplight.

Figure 6:
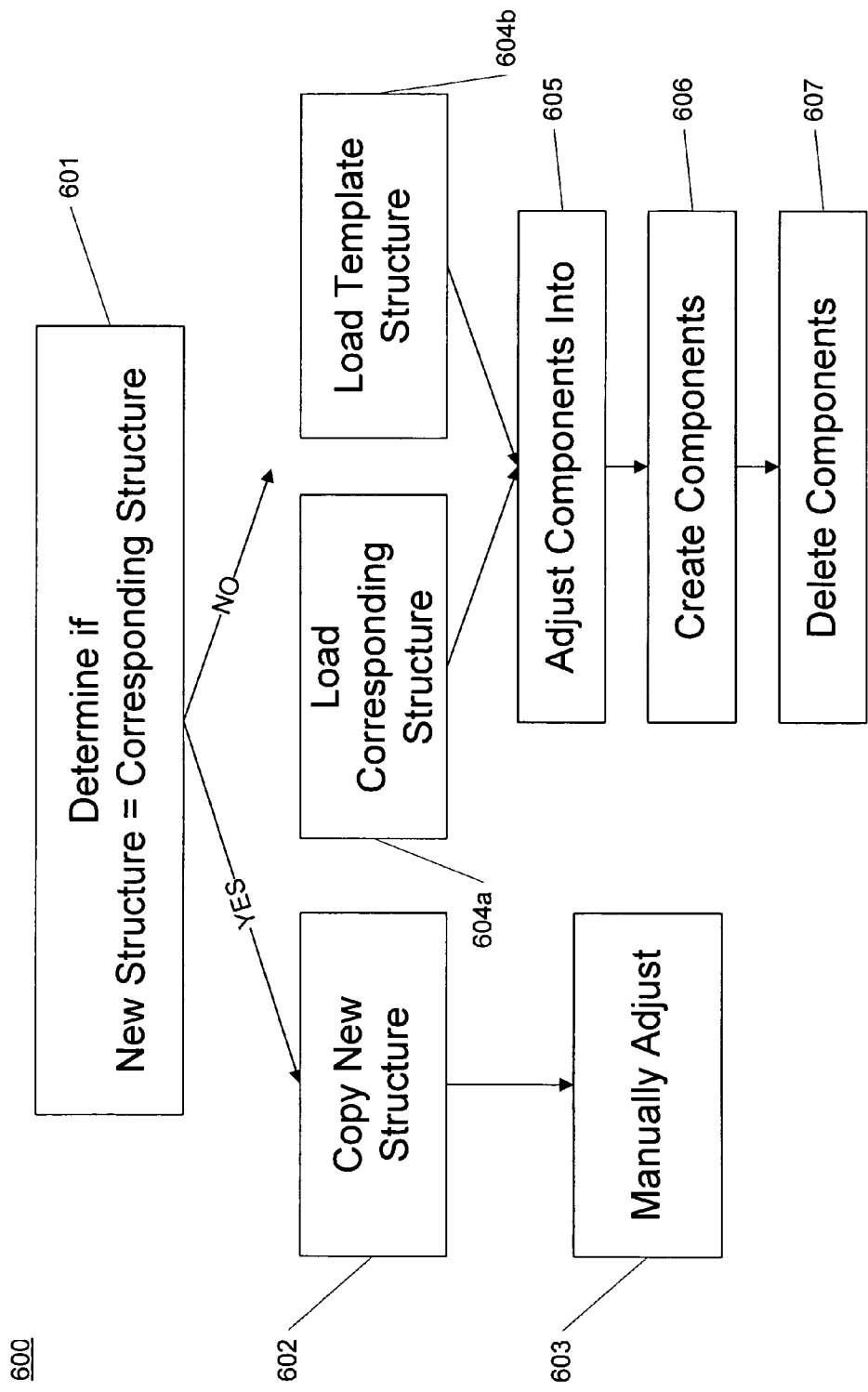
FIG. 6 is a flowchart of an exemplary method for preprocessing functional locations of a technical object and its components, consistent with a disclosed embodiment.

FIG. 6 is a flowchart of exemplary method 600 for checking consistency of a functional location of a structure or component, consistent with a disclosed embodiment. A receiving business partner may perform method 600 during a preprocessing of a new structure. In step 601, the receiving business partner may make a determination regarding whether functional locations of a new structure, generated based on an XML file, are consistent with the functional locations of a corresponding structure that may have been stored in a database of the receiving business partner.

If the determination is positive, then in step 602, the new structure may be copied to replace the corresponding structure. In step 603, a user may manually adjust the copied structure.

If a determination is made that functional locations of the new structure are not consistent with the functional locations of a corresponding structure, then the receiving business partner may perform step 604*a* or step 604*b*. The receiving business partner may perform step 604*a* if there is a corresponding structure to the new structure. A corresponding structure represents information about components and configuration of the components in the technical object. The information may have been created, modified, and stored before the technical object was previously provided by the receiving business partner to a different business partner. The new structure is based on information in an XML file, provided by a business partner who now has handed over the technical object back to the receiving business partner. If the technical object is new for the receiving business partner, in step 604*b*, the receiving business partner may retrieve a template structure for the type of the technical object.

In step 605, components of the new structure may be adjusted. In step 606, new components may be created and added to the structure. The new components may also be copied from the corresponding structure or the template structure. In step 607, components may be deleted from the structure.

Figure 7:
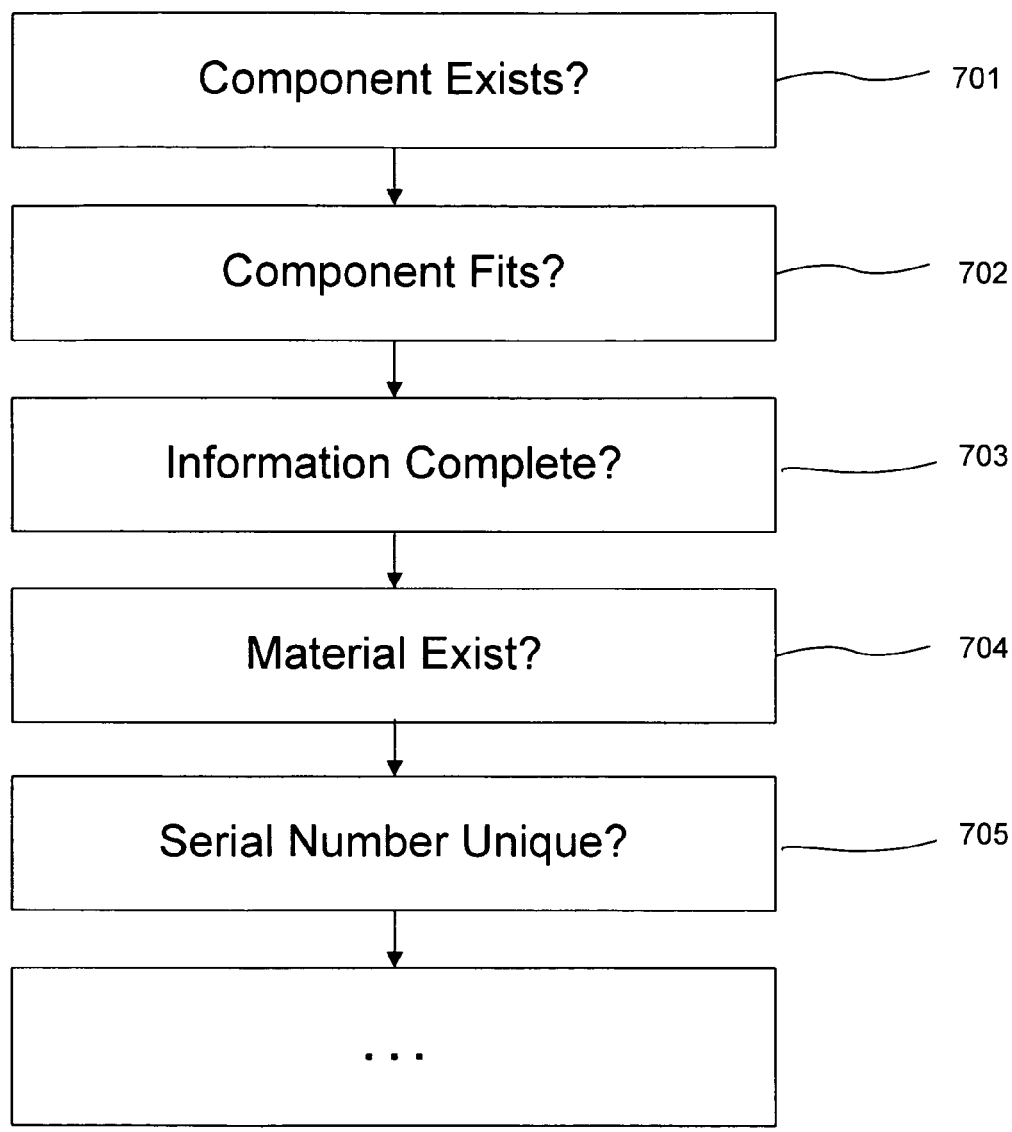
FIG. 7 is a flowchart of an exemplary method for performing a consistency check, consistent with a disclosed embodiment.

FIG. 7 is a flowchart of exemplary method 700 for performing a consistency check, consistent with a disclosed embodiment. A business partner may perform a consistency check before or as part of the preprocessing method. The business partner may perform the consistency check on a new structure based on a corresponding structure, a template structure, and/or other preset rules/structure. In step 701, the business partner may determine whether a component in the new structure exists in the corresponding structure or template structure. In step 702, the business partner may determine whether a component is properly configured within the new structure. The business partner may make the determination regarding proper configuration of a component based on the functional location assigned to the component.

In step 703, the business partner may make a determination regarding whether the information for the component in the structure is complete. In step 704, the business partner may make a determination regarding whether the material assigned to a component exists (or is properly named based on the receiving business partners usage).

In step 705, the business partner may make a determination regarding whether a serial number assigned to a component is unique. The above described determinations are mere examples of determinations the business partner may make during a consistency check and a data correctness check. The receiving business partner may create a series of other determinations for the component data of a new structure. Method 700 may also be performed on the entire new structure as a whole and individual subcomponents of each component.

Figure 8:
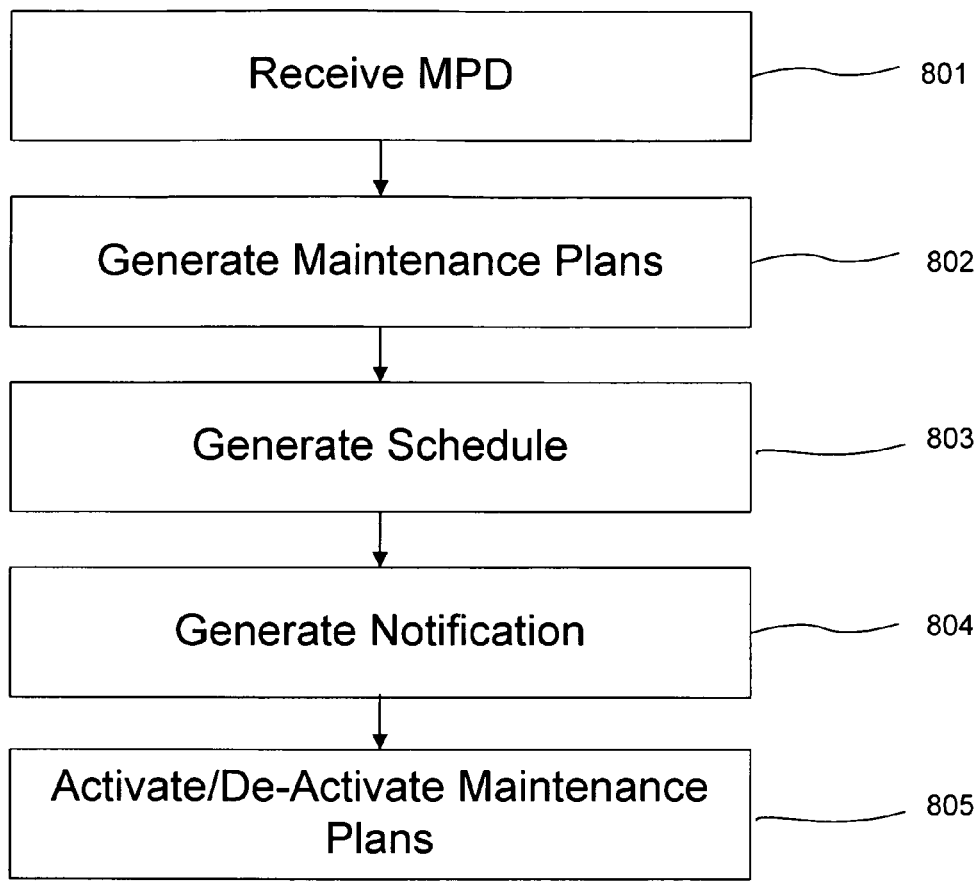
FIG. 8 is a flowchart of an exemplary method for creating and scheduling maintenance, consistent with a disclosed embodiment.

FIG. 8 is a flowchart of an exemplary method 800 for creating and scheduling maintenance, consistent with a disclosed embodiment. In step 801, a business partner may receive maintenance program definitions ("MPD") for a technical object. In step 802, the business partner may generate maintenance plans for the technical object, and the individual components that comprise the technical object, based on the MPD and the structure representing the technical object.

In step 803, the business partner may generate a schedule for performing the maintenance plans. In step 804, the business partner may generate notifications to notify the business partner regarding actions that need to be taken to maintain the technical object.

In step 805, the business partner may de-activated or activate maintenance plans that have been scheduled. For example, the business partner may de-activate a maintenance plan after maintenance specified by the maintenance plan is performed.

Figure 9:
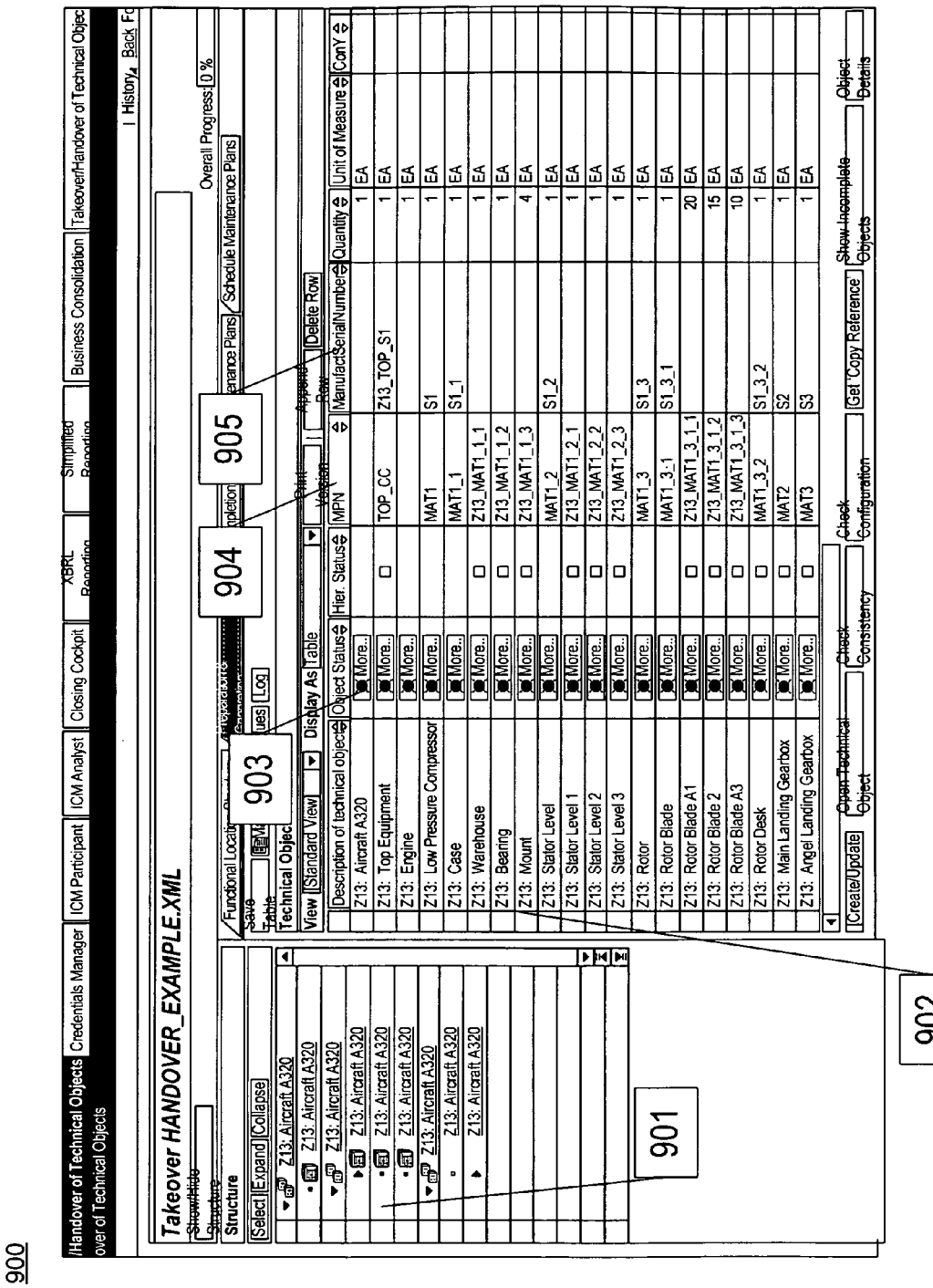
FIG. 9 illustrates an exemplary user interface for displaying information about a structure of a technical object, consistent with a disclosed embodiment.

FIG. 9 illustrates exemplary user interface 900 for displaying structure of a technical object, consistent with a disclosed embodiment of the invention. In the following example, the technical object is an "Aircraft." Area 901 displays the hierarchical representation of the components of an "Aircraft." "Engine" and "Wing Assembly" are components of the "Aircraft." "Middle Wing" and "Air Brakes" are subcomponents of the "Aircraft." "Middle Wing" and "Air Brakes" are components of "Wing Assembly." For example, "Wing," "Middle Wing," and "Air Brakes" are individual technical objects.

Area 902 shows a listing of all the components and subcomponents for an aircraft. Stoplight 903 indicates if the aircraft is consistent based on a method described in FIG. 7. Column 904 and column 905 are examples of information (parameters) that may be associated with a component. Column 904 lists the manufacturer part number. Column 905 lists serial numbers.

Figure 10:
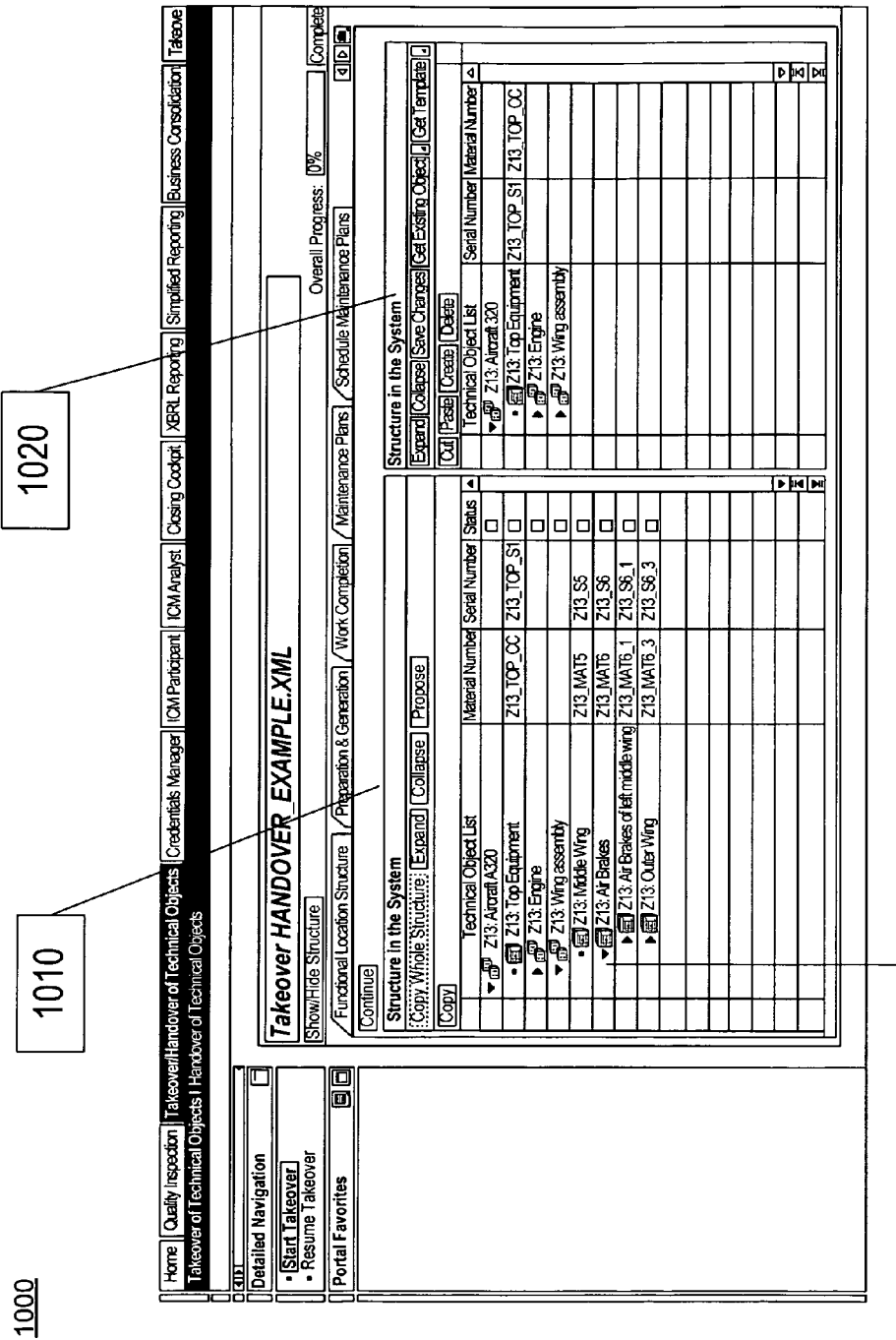
FIG. 10 illustrates an exemplary user interface for displaying information about a new structure and a corresponding structure for a technical object, consistent with a disclosed embodiment.

FIG. 10 is an exemplary user interface 1000 for displaying information about a new structure and a corresponding structure of a technical object, consistent with a disclosed embodiment. In this example, area 1010 displays the representation of the new structure. The new structure is generated based on an XML file that may be received during a takeover for the technical object. The user interface may display the configuration of the technical object by displaying a hierarchical representation 1011 of the components of the technical object. In this example, area 1020 displays the representation of the corresponding structure or template structure. The corresponding structure or template structure may have been stored in the system of the receiving business partner for the technical object before the last takeover of the technical object occurred.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments may be implemented as a combination of hardware and software or in hardware alone. Examples of hardware include computing or processing systems, including personal computers, servers, laptops, mainframes, micro-processors and the like. Additionally, although aspects are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments have been described herein, the scope of thereof includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A computer-implemented method for monitoring components of a physical item during a life cycle of the physical item, the method comprising:
   receiving by a business entity, an XML file for the physical item from a transmitting business entity during the life cycle of the physical item, wherein:
   the physical item comprises a plurality of components,
   the XML file includes information related to the physical item and maintenance information for the physical item, and
   the XML file is based on a pre-defined XML schema and global data types;
   generating a first structure to represent the physical item based on the XML file, the first structure comprising data indicative of the components and configuration of the components;
   determining if the physical item is a new type of physical item;
   retrieving a second structure from a backend component if the physical item is not the new type of physical item, wherein the second structure comprises at least one of an existing structure previously stored for the physical item or a template structure for a type of the physical item;
   retrieving a template structure from the backend component if the physical item is the new type of physical item;
   preprocessing the first structure in accordance with a consistency check by comparing the first structure to the second structure or the template structure; and
   storing the first structure in the backend component.

2. The method according to claim 1, wherein preprocessing further comprises determining if the first structure is equivalent to the second structure, wherein the determination is based on comparing functional locations.

3. The method according to claim 2, wherein if the determination is positive, adopting the first structure as the second structure; and wherein if the determination is negative, preprocessing further comprises adjusting the first structure based on the second structure.

4. The method according to claim 1, wherein the preprocessing of the first structure further comprises:
   determining whether there is a corresponding component indicated by the second structure for each one of the components indicative by the first structure; and
   determining whether data associated with the components and subcomponents of the components is proper based on the second structure.

5. The method according to claim 4, wherein preprocessing further comprises adjusting the first structure based on the consistency check.

6. The method according to claim 5, wherein adding the first structure to the backend component comprises replacing the second structure with the first structure in the backend component.

7. The method according to claim 1, wherein a status of the preprocessing of the data associated with an individual component indicated by the first structure is displayed using an indicator for the individual component.

8. The method according to claim 1, further comprising storing an intermediate state of the preprocessing of the data associated with an individual component indicated by the first structure.

9. The method according to claim 8, further comprising resuming the preprocessing of the data associated with the individual component from the intermediate state.

10. The method according to claim 4, wherein determining whether data associated with the components and the subcomponents of the components is proper comprises determining if a functional location of the components is proper.

11. The method according to claim 1, further comprising displaying the configuration of the first structure by displaying a hierarchical representation of the components and subcomponents of the components.

12. The method according to claim 1, further comprising displaying the first structure and the second structure in a user interface.

13. The method according to claim 12, further comprising modifying the first structure in the user interface.

14. The method according to claim 13, further comprising assigning a new component to the first structure and deleting the data associated with one of the components from the first structure.

15. The method according to claim 14, wherein data of the new component is marked based on a status of the assigning of the new component.

16. The method according to claim 1, further comprising:
automatically detecting a change in the physical item; and
modifying the first structure based on the change.

17. A system for monitoring components of a physical item during a life time cycle of the item, the system comprising:
a database for storing information corresponding the physical item during the life cycle of the physical item, the physical item comprising a plurality of physical components;
a computer comprising a processor for:
generating a first structure comprising data representing the physical item and the physical components based on the information corresponding the physical item, the data comprising information related to the physical item and maintenance information for the physical item;
generating XML file based on the first structure from a transmitting business entity to a receiving business entity during the life cycle of the physical item, the XML file is being generated according to a pre-defined XML schema and global data type;
determining if the physical item is a new type of physical item;
retrieving a second structure previously stored for the physical item if the physical item is not the new type of physical item;
retrieving a template structure associated with the new type of physical item if the physical item is the new type of physical item;
performing a consistency check of the first structure based on a second structure or a template structure; and
a display unit for displaying a visual representation of the first structure in a user interface.

18. The system according to claim 17, further comprising a communication unit for transmitting the information corresponding to the physical item to the receiving business entity.

19. The system according to claim 17, wherein the user interface provides a user with an ability to modify the first structure.

20. The system according to claim 17, wherein the display unit displays the first structure based on the XML file and the second structure, and wherein the second structure is stored in the database.

21. The system according to claim 17, wherein the processor automatically detects modifications in the physical item and adjusts the first structure based on the modifications.

22. The system according to claim 20, wherein the processor displays an indicator on the user interface to indicate a status of the consistency check.

23. A non-transitory computer-readable media storing a program for causing a computer to perform a method for monitoring components of a physical item during a life cycle of the physical item, the method comprising:
receiving an XML file for the physical item by a receiving business entity from a transmitting business entity during the life cycle of the physical item, wherein:
the physical item comprises a plurality of components,
the XML file includes information related to the physical item and maintenance information for the physical item, and
the XML file is based on a pre-defined XML schema and global data types;
generating a first structure to represent the physical item based on the XML file, wherein the first structure comprises data representing the components of the physical item and a configuration of the components;
determining if the physical item is a new type of physical item;
retrieving a second structure from a backend component if the physical item is not the new type of physical item, wherein the second structure comprises at least one of an existing structure previously stored for the physical item or a template structure for a type of the physical item;
retrieving a template structure from the backend component if the physical item is the new type of physical item;
preprocessing the first structure in accordance with a consistency check by comparing the first structure to the second structure of the template structure; and
storing the first structure to the backend component.

* * * * *